US006604661B2

(12) United States Patent
Feller et al.

(10) Patent No.: US 6,604,661 B2
(45) Date of Patent: Aug. 12, 2003

(54) METHOD AND APPARATUS FOR DETECTING WEB BREAKS

(75) Inventors: Bernhard Feller, Friedberg (DE); Robert Kersch, Dasing (DE); Harald Pecher, Augsburg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/871,128

(22) Filed: May 31, 2001

(65) Prior Publication Data

US 2002/0008129 A1 Jan. 24, 2002

(30) Foreign Application Priority Data

Jun. 2, 2000 (DE) ........................................ 100 27 442

(51) Int. Cl.[7] .......................... B65H 43/00; B23Q 15/00
(52) U.S. Cl. ............................ 226/11; 226/45; 101/181
(58) Field of Search .............................. 226/11, 33, 43, 226/45; 101/181

(56) References Cited

U.S. PATENT DOCUMENTS 4,852,785 A * 8/1989 Bettendorf et al. ........... 226/42
5,377,589 A * 1/1995 Kruger et al. .............. 101/181
5,678,484 A * 10/1997 Callan et al. ................. 226/11
5,826,505 A * 10/1998 Volz et al. .................. 101/181
5,901,647 A 5/1999 Kohlmann
5,967,445 A 10/1999 Yuyama et al.
6,298,782 B1 * 10/2001 Gregory et al. ............... 226/11
6,433,499 B1 * 8/2002 Cote et al. .................... 226/45

FOREIGN PATENT DOCUMENTS

GB 2 337 484 11/1999

OTHER PUBLICATIONS

IBM Technical Disclosure Bulletin, vol. 37, No. 02A, Feb. 1994, S.281, “Non–Optical Printer Document Sensor”.

* cited by examiner

*Primary Examiner*—Michael R. Mansen
(74) *Attorney, Agent, or Firm*—Cohen, Pontani, Lieberman & Pavane

(57) ABSTRACT

In web-fed rotary printing machines having a plurality of operating units arranged one after another, each unit having synchronously driven elements that interact directly or indirectly with the printing-material web, high reliability and short response times are achieved by a torque monitoring device having inputs for signals corresponding to the torque on at least one element of each operating unit. Upon the occurrence of an abrupt torque change on at least one monitored element, the monitoring device generates an output signal associated with a web break.

11 Claims, 2 Drawing Sheets

METHOD AND APPARATUS FOR DETECTING WEB BREAKS

BACKGROUND OF THE INVENTION

1. Field of the Invention

The invention relates to a method and an apparatus for detecting web breaks in web-fed rotary printing machines having a plurality of operating units which are arranged one after another and whose elements that interact directly or indirectly with the printing-material web can be driven synchronously.

2. Description of the Related Art

Until now, web break switches, as they are known, have been used for detecting web breaks. In most cases, these are optical sensors in the form of light barriers which, in the event of an impermissible deflection of an associated area of the printing-material web, output a signal. This is based on the finding that the printing-material web loses its tension in the event of a web break and leaves the normal transport plane. In order to assist this, blower nozzles are often associated with the optical sensors, which nozzles accelerate the deflection of the printing-material web which has lost its tension in the event of a web break.

The provision and installation of the aforementioned web break switches requires a comparatively high outlay. Since the optics of the light barriers can be impaired by their becoming dusty and soiled, high outlay on monitoring and maintenance is also required in order to ensure reliable serviceability. In addition, the known devices need a different amount of time to detect a web break, depending on their location.

SUMMARY OF THE INVENTION

The object of the present invention is to improve a method and an apparatus of the type mentioned at the beginning, with simple and cost-effective means, in such a way that high reliability and short reaction times are ensured.

In the method according to the invention, the torque on at least one element that belongs to each operating unit and interacts directly or indirectly with the printing material web is monitored continuously and a signal for a web break is derived from the occurrence of an abrupt torque change on the monitored element of at least one operating unit. In the apparatus according to the invention, a torque monitoring device is provided which has inputs for signals corresponding to the torque on at least one element that belongs to each operating unit and interacts directly or indirectly with the printing-material web and which, upon the occurrence of an abrupt torque change on at least one monitored element, generates an output signal associated with a web break.

Instead of sensors, the invention makes use of the torque profile which is characteristic in the event of a web break. This is based on the thought that, as long as the paper web does not have a break, the web forces which act upstream and downstream of a nip or cylinder gap through which the printing-material web passes cancel each other out. In this case, the drive devices output only the processing and flexing torques. In the event of a web break, the web force falls away in one or the other direction, so that the web forces no longer cancel each other out in relation to a nip or cylinder gap adjacent to the web break, and an additional torque acts on the associated drive device and manifests itself as an abrupt change, which can be interpreted as a web break. A further advantage is to be seen in the fact that the abrupt torque change on a monitored element at the same time also results in a reference to the point of the web break in the vicinity of this element. A further advantage is to be seen in the fact that torque monitoring can also be used to provide overload protection.

The abrupt torque change occurs simultaneously on two operating units that flank the location of the web break and have elements that roll on the printing-material web, a rise in torque resulting on the operating unit which is downstream with respect to the web break, and a fall in torque resulting on the operating unit which is upstream of the web break. Expediently, therefore, a signal for a web break can be derived from the simultaneous occurrence of opposite torque changes on two elements that belong to successive operating units and interact directly or indirectly with the printing-material web. In this way, it is extremely simply possible to distinguish the torque variation characteristic of a web break from torque changes which can be attributed to other disturbances, such as channel impacts, creases in the paper web, etc, and therefore to achieve particularly high reliability.

In the case of web-fed rotary printing machines in which each operating unit which has elements that roll on the printing-material web and in each case has at least one motor associated with it, the torque output by a motor to each such operating unit can advantageously be monitored continuously. This results in electrical variables which automatically correlate with the torque, which makes signal processing easier.

In a further development of the above measures, in the case of a web-fed rotary printing machine with individual drive to the elements that roll on the printing-material web, the torque output by a motor associated with an element directly involved in web transport is monitored continuously. In this case, the abrupt torque change appears particularly clearly, which makes monitoring easier and ensures the achievement of high reliability.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
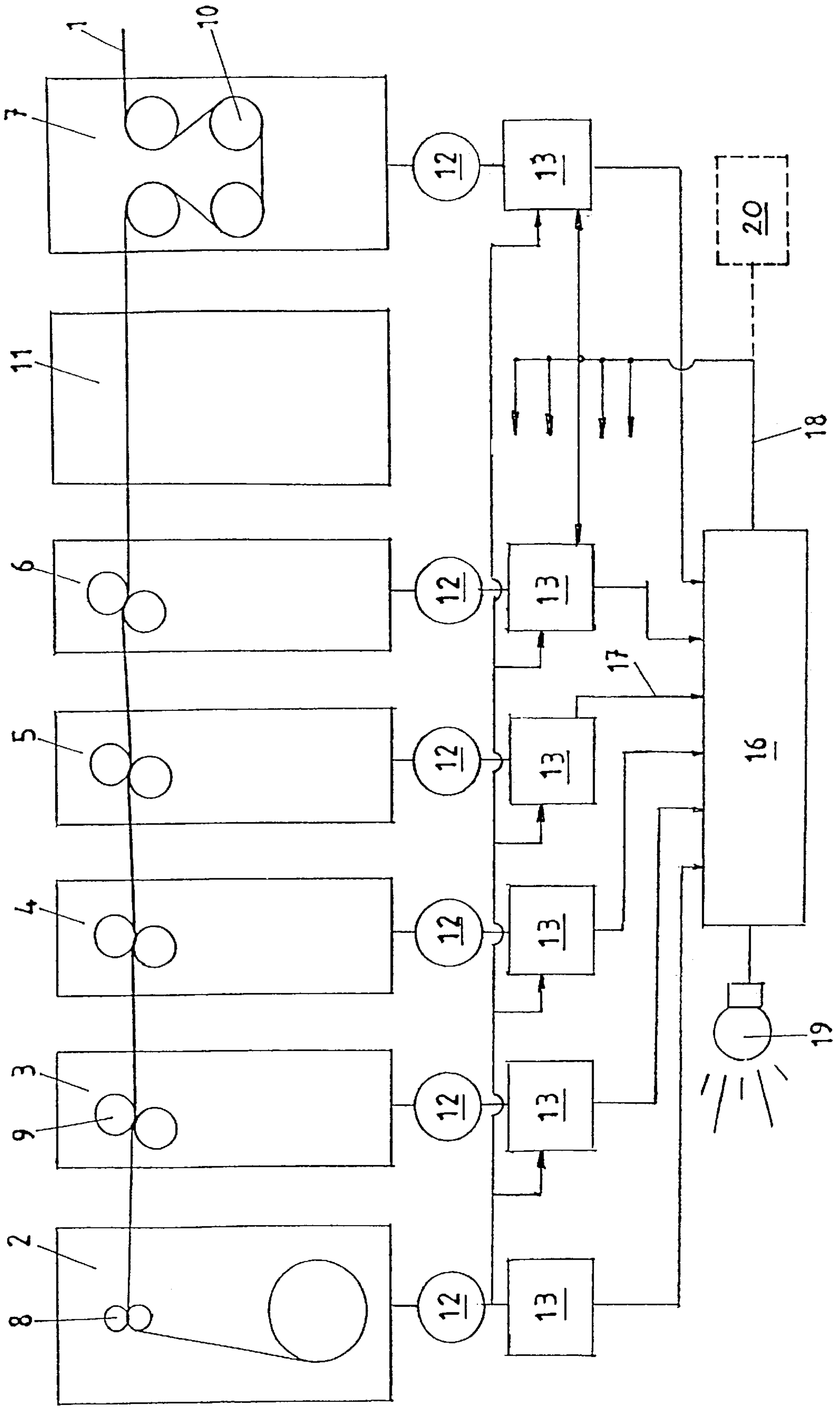
FIG. 1 shows a schematic view of a web-fed rotary printing machine with detection apparatus according to the invention.

The web-fed rotary printing machine on which FIG. 1 is based contains a plurality of operating units which are arranged along the path of the printing-material web 1 and are provided with elements which form a gap through which the printing-material web 1 runs and, consequently, are involved directly in web transport. The operating units include a roll carrier 2, four printing units 3, 4, 5, 6 each containing a double printing unit, and a chill-roll stand 7. The roll carrier 2 contains driven transport rolls 8, between which the printing-material web 1 is clamped. The printing units 3 to 6 contain driven transfer cylinders 9 which roll on one another and between which the printing-material web 1 is led. The chill-roll stand 7 contains driven chill rolls 10 around which the printing-material web 1 wraps. Arranged between the last printing unit 6 and the chill-roll stand 7 is a dryer 11 which does not contain any elements involved in web transport.

In order to provide the drive to the elements belonging to the operating units 2 to 7 and involved in web transport, drive motors 12 are provided. In this case, the elements involved in web transport may be in the form of individual motors associated with the pull rolls 8, transfer cylinders 9 and chill rolls 10, of which only one motor 12 per operating unit is illustrated in FIG. 1 in order to simplify the illustration. However, it would also be conceivable to assign one motor of the type indicated at 12 to each operating unit which contains driven elements that interact with the printing-material web.

In each case, all the motors 12 are synchronized by means of rotational speed and/or rotational angle control. To this end, the motors 12 have controllers 13 associated with them, at least one reference variable generated by a first controller 13 being predefined to the following controllers 13. This results in a cascade circuit with high reliability.

Figure 2:
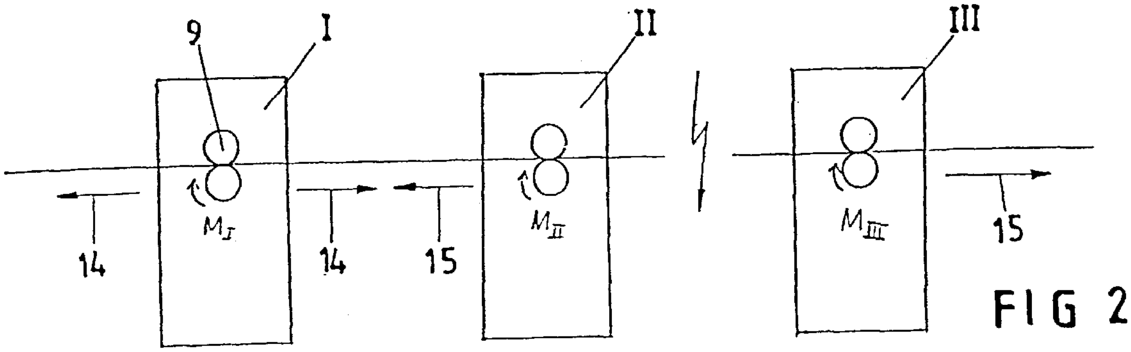
FIG. 2 shows a detail from a web-fed rotary printing machine with a broken printing-material web.

During normal, interference-free operation, the web forces acting upstream and downstream of an operating unit are cancelled out by driven elements involved in web transport, as is indicated on the left in FIG. 2 with respect to a printing unit I by equally large force arrows 14 directed away from the printing unit I. If the printing-material web 1 breaks, as indicated in FIG. 2 in the area between the printing units II, III, the web forces on the operating units adjacent to the break, here II, III, no longer cancel out. The force arrows 15 directed rearward from the printing unit II and forward from the printing unit HI are not opposed by any force arrows pointing towards the web break.

In the first case, with force equivalence (FIG. 2, left), the drive devices to the elements interacting with the printing-material web 1 output only the process and flexing torques. In the second case, without force equivalence (FIG. 2, right), an additional torque brought into effect by the printing-material web 1 acts on the elements that interact with the printing-material web 1. This has the effect of an abrupt change in the current torque, which can be interpreted as a web break.

Figure 3:
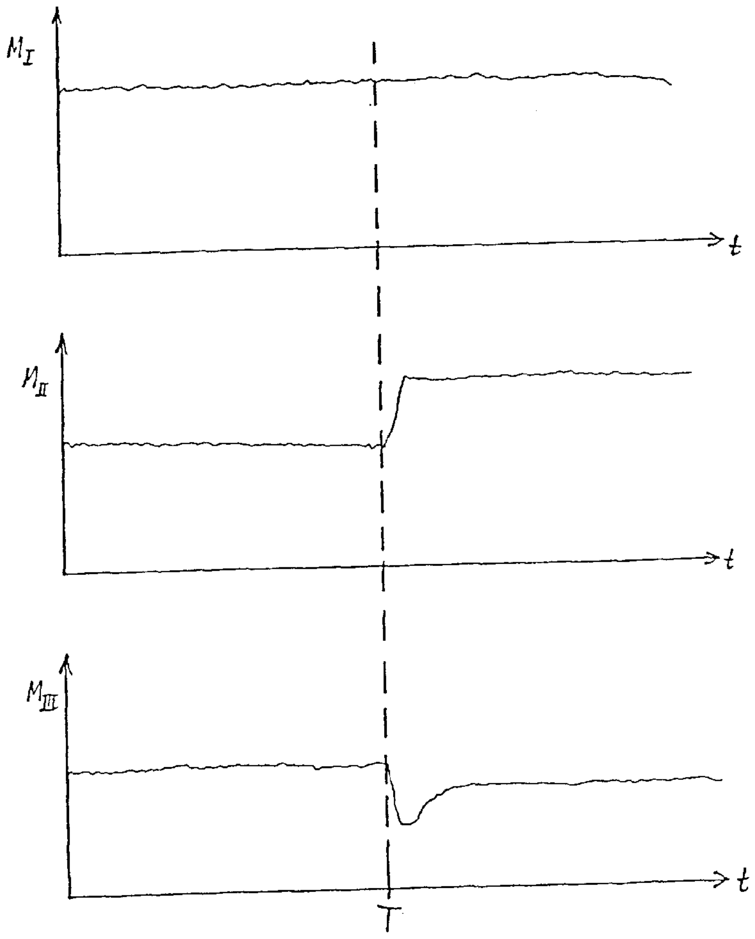
FIG. 3 shows the torque variation on the cylinders that interact with the printing-material web and belong to the arrangement of FIG. 2.

FIG. 3 shows the torque variation on the transfer cylinders 9 of the printing units I, II, III on which FIG. 2 is based against time. At the time T, a web break is to occur in the area between the printing units II, III. The torque $M_I$ acting on the transfer cylinders 9 of the printing unit I shows an approximately constant variation even beyond the time T. The torque $M_{II}$ acting on the transfer cylinders 9 of the printing unit II located upstream of the web break, and the torque $M_{III}$ acting on the transfer cylinders 9 of the printing unit III located downstream of the web break show an abrupt change at the time T, starting from a likewise constant torque variation. The torque $M_{II}$ rises steeply because of the web force directed upstream. The torque $M_{III}$ falls off steeply because of the web force directed downstream and then increases slightly again, but not as far as the original level.

This simultaneous, opposite change in the torques $M_{II}$ and $M_{III}$ is a particularly reliable indication of a web break, it being possible at the same time to detect the local position of the web break, here in the area between the printing units II, III.

In order to provide a reliable web break detection apparatus operating with the torque change shown above, the instantaneous torque of the drive motors 12 is determined and monitored. To this end, as indicated in FIG. 1, a torque monitoring device 16 is provided, and is provided with inputs 17 associated with the motors 12 or their controllers 13 for a signal correlating with the respective instantaneous torque. In this case, this may expediently be a signal which arises in any case in the controllers 13 for the purpose of controlling the rotational angle and rotational speed. Use is expediently made of electrical signals which indicate the instantaneous torque. The torque monitoring device 16 is constructed in such a way that, upon the occurrence of an abrupt change, on which FIG. 3 is based, in the monitored torque on a motor 12 or, preferably, in the event of the simultaneous occurrence of opposite changes in the monitored torque on two motors 12 of successive operating units, the torque monitoring device 16 generates an output signal that is assigned to a web break, as indicated in FIG. 1 by the output signal line 18. A signal may also actuate an alarm 19. The torque monitoring device 16 can be constructed as a computing device, which determines the instantaneous torque from a value correlated therewith and detects an abrupt change.

The output signal generated by the torque monitoring device 16 upon the occurrence of an abrupt torque change according to FIG. 3 can be used to activate a device for preventing machine damage. In this case, this may be a web catching apparatus 20 and/or a web knock-off device, etc. In the example illustrated by means of the output signal generated in the event of a web break, as indicated by the output signal line 18, the controllers 13 are driven in such a way that all the driven elements involved in web transport are stopped as quickly as possible, preferably within a revolution. If small rotating masses are used, which is possible in particular in the case of individual drives, this may be achieved within one revolution or within only a few revolutions.

The values calculated by the torque monitoring device 16 can advantageously also be used to provide torque limitation or overload protection.

It is sufficient if in each case one motor is monitored for each driven operating unit. In the case of individual drive to the driven elements, in each case a motor belonging to an element which interacts directly with the printing-material web 1 and is therefore directly involved in web transport is expediently monitored. If only one motor is provided per operating unit, this motor is monitored. If the drive device contains a line shaft which passes through all the operating units and interacts with a motor, the operating units or a driven element of each operating unit must be assigned torque sensors, whose outputs are connected to the inputs 17 of the torque monitoring device 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of detecting a web break in a web-fed rotary printing machine having a plurality of operating units arranged in tandem, each said operating unit having at least one element which interacts with the printing material web, said method comprising driving said elements synchronously, each element being individually driven with a torque, monitoring the torque on each said element individually, and deriving a signal indicating a web break in response to an abrupt change in torque in at least one operating unit.

2. A method as in claim 1 wherein a signal indicating a web break is derived when said torque changes oppositely on two elements in two successive operating units simultaneously.

3. A method as in claim 1 wherein at least one said element in each said operating unit rolls on the printing material web, each said at least one element being driven by a respective motor, the torque output by each said motor being monitored continuously.

4. A method as in claim 1 wherein at least one element in each said operating unit interacts directly with the printing material web to transport it, and is driven by a torque which is monitored.

5. A method as in claim 4 wherein each said element which interacts directly with the printing material web to transport it is driven by a respective motor, each said motor outputting a torque which is monitored continuously.

6. An apparatus for detecting a web break in a web-fed rotary printing machine having a plurality of operating units arranged in tandem, each said operating unit having at least one element which interacts with the printing material web, each element being individually driven with a torque, said apparatus comprising control means for driving said elements synchronously and for generating signals corresponding to the torque driving each said element, and a torque monitoring device which evaluates said signals corresponding to the torque and generates an output signal indicating a web break in response to an abrupt change in torque in at least one operating unit.

7. An apparatus as in claim 6 wherein said torque monitoring device generates an output signal indicating a web break when said torque changes oppositely on two elements in two successive operating units simultaneously.

8. An apparatus as in claim 6 wherein at least one element in each said operating unit interacts directly with the printing material web to transport it, and is driven by a respective motor, said control means comprising a control device associated with each said motor, each said control device generating a signal corresponding to the torque driving said at least one element in each said operating unit, said torque monitoring device having an input for each respective said control device.

9. An apparatus as in claim 6 wherein said torque monitoring device comprises a computer which calculates the torque for each said driven element generates said signal when an abrupt torque change on at least one monitored element occurs.

10. An apparatus as in claim 6 further comprising a device for preventing damage to said rotary printing machine, said device for preventing damage being activated by said output signal of said torque monitoring device.

11. An apparatus as in claim 6 wherein at least one element in each said operating unit interacts directly with the printing material web to transport it, and wherein said torque monitoring device comprises means for stopping said elements which interact with the printing material web within a revolution.

* * * * *